(12) United States Patent
Pearce

(10) Patent No.: US 8,310,077 B2
(45) Date of Patent: Nov. 13, 2012

(54) TIDAL ELECTRICITY GENERATING APPARATUS

(75) Inventor: Colin Richard Pearce, Stokesley (GB)

(73) Assignee: C-Power Limited (GB)

(*) Notice: Subject to any disclaimer, the term of this patent is extended or adjusted under 35 U.S.C. 154(b) by 334 days.

(21) Appl. No.: 12/521,986

(22) PCT Filed: Jan. 2, 2008

(86) PCT No.: PCT/GB2008/000012
§ 371 (c)(1),
(2), (4) Date: Jul. 1, 2009

(87) PCT Pub. No.: WO2008/081187
PCT Pub. Date: Jul. 10, 2008

(65) Prior Publication Data
US 2010/0133844 A1 Jun. 3, 2010

(30) Foreign Application Priority Data

Jan. 4, 2007 (GB) .................................. 0700128.2

(51) Int. Cl.
*H02K 7/00* (2006.01)
*F03B 3/00* (2006.01)
(52) U.S. Cl. .......................................................... 290/54
(58) Field of Classification Search .................. 290/54
See application file for complete search history.

(56) References Cited

U.S. PATENT DOCUMENTS

| | | | | |
|---|---|---|---|---|
| 3,143,972 A * | 8/1964 | Smith et al. | ................... | 417/356 |
| 4,421,990 A * | 12/1983 | Heuss et al. | ................... | 290/53 |
| 4,850,190 A | 7/1989 | Pitts | ................... | 60/398 |
| 5,484,266 A * | 1/1996 | Murga | ................... | 417/44.1 |
| 5,548,956 A | 8/1996 | Price | ................... | 60/369 |
| 6,648,589 B2 * | 11/2003 | Williams | ................... | 415/1 |
| 6,729,840 B2 * | 5/2004 | Williams | ................... | 415/3.1 |
| 7,190,087 B2 * | 3/2007 | Williams | ................... | 290/53 |
| 7,218,011 B2 * | 5/2007 | Hiel et al. | ................... | 290/43 |
| 7,378,750 B2 * | 5/2008 | Williams | ................... | 290/43 |
| 7,425,772 B2 * | 9/2008 | Novo Vidal | ................... | 290/52 |
| 7,471,009 B2 * | 12/2008 | Davis et al. | ................... | 290/54 |
| 7,492,054 B2 * | 2/2009 | Catlin | ................... | 290/54 |
| 7,541,688 B2 * | 6/2009 | Mackie | ................... | 290/54 |
| 7,605,486 B2 * | 10/2009 | Bridwell | ................... | 290/43 |

(Continued)

FOREIGN PATENT DOCUMENTS

CA 1 202 832 4/1986

(Continued)

OTHER PUBLICATIONS

International Search Report and Written Opinion from PCT Application No. PCT/GB2008/000012 which was mailed on Apr. 8, 2008.

(Continued)

*Primary Examiner* — Joseph Waks
(74) *Attorney, Agent, or Firm* — Zilka-Kotab, PC

(57) ABSTRACT

A turbine adapted to be constrained within a flow of fluid includes a stator adapted to be constrained within a flow of fluid, and a rotor defining an aperture and having rotor blades protruding from a peripheral region of the rotor into the aperture. The rotor is adapted to be rotatably mounted to the stator such that movement of fluid through the aperture causes rotation of the rotor relative to the stator. Electricity is generated as a result of rotation of the rotor relative to the stator.

30 Claims, 18 Drawing Sheets

U.S. PATENT DOCUMENTS

| | | | |
|---|---|---|---|
| 7,874,788 B2 * | 1/2011 | Stothers et al. | 415/4.5 |
| 2002/0088222 A1 | 7/2002 | Vauthier | 60/398 |
| 2005/0005592 A1 | 1/2005 | Fielder | 60/200.1 |

FOREIGN PATENT DOCUMENTS

| | | |
|---|---|---|
| CA | 2 352 673 | 5/2003 |
| EP | 0 099 796 | 1/1984 |
| EP | 1 878 911 | 1/2008 |
| EP | 1 878 912 | 1/2008 |
| EP | 1 878 913 | 1/2008 |
| EP | 1 879 280 | 1/2008 |
| EP | 1 952 014 A1 | 8/2008 |
| GB | 2 283 285 | 3/1995 |
| JP | 59-203881 | 11/1984 |
| WO | 2007/0055585 | 5/2007 |
| WO | WO 2007055585 A1 * | 5/2007 |
| WO | WO 2008006601 A1 * | 1/2008 |
| WO | WO 2008006602 A1 * | 1/2008 |
| WO | WO 2008006603 A1 * | 1/2008 |
| WO | WO 2008006614 A1 * | 1/2008 |

OTHER PUBLICATIONS

Examination Report from GB Application No. GB0910721.0 dated Jul. 10, 2009.

European Office Action from application No. GB0910721.0 dated Jul. 10, 2009.

* cited by examiner

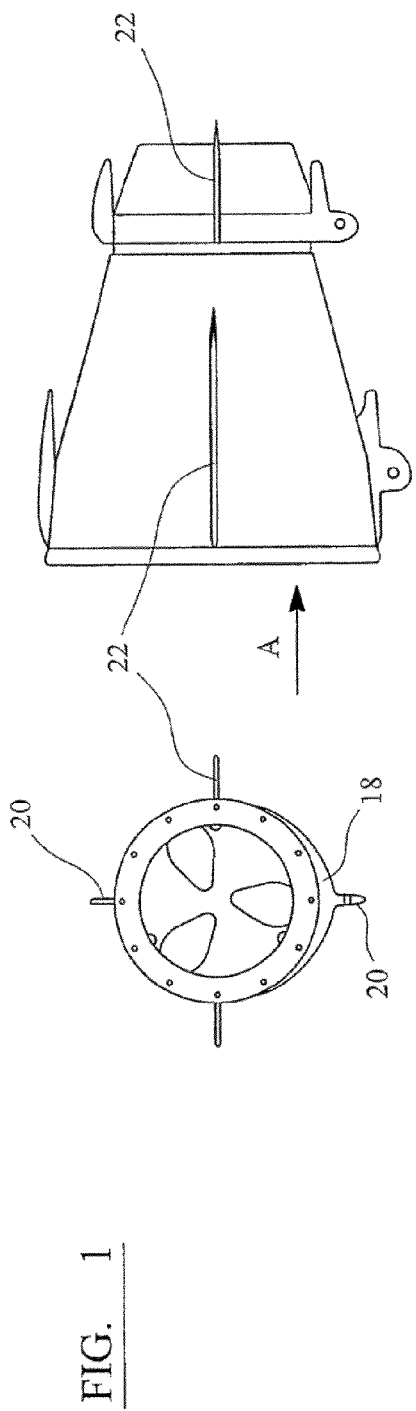

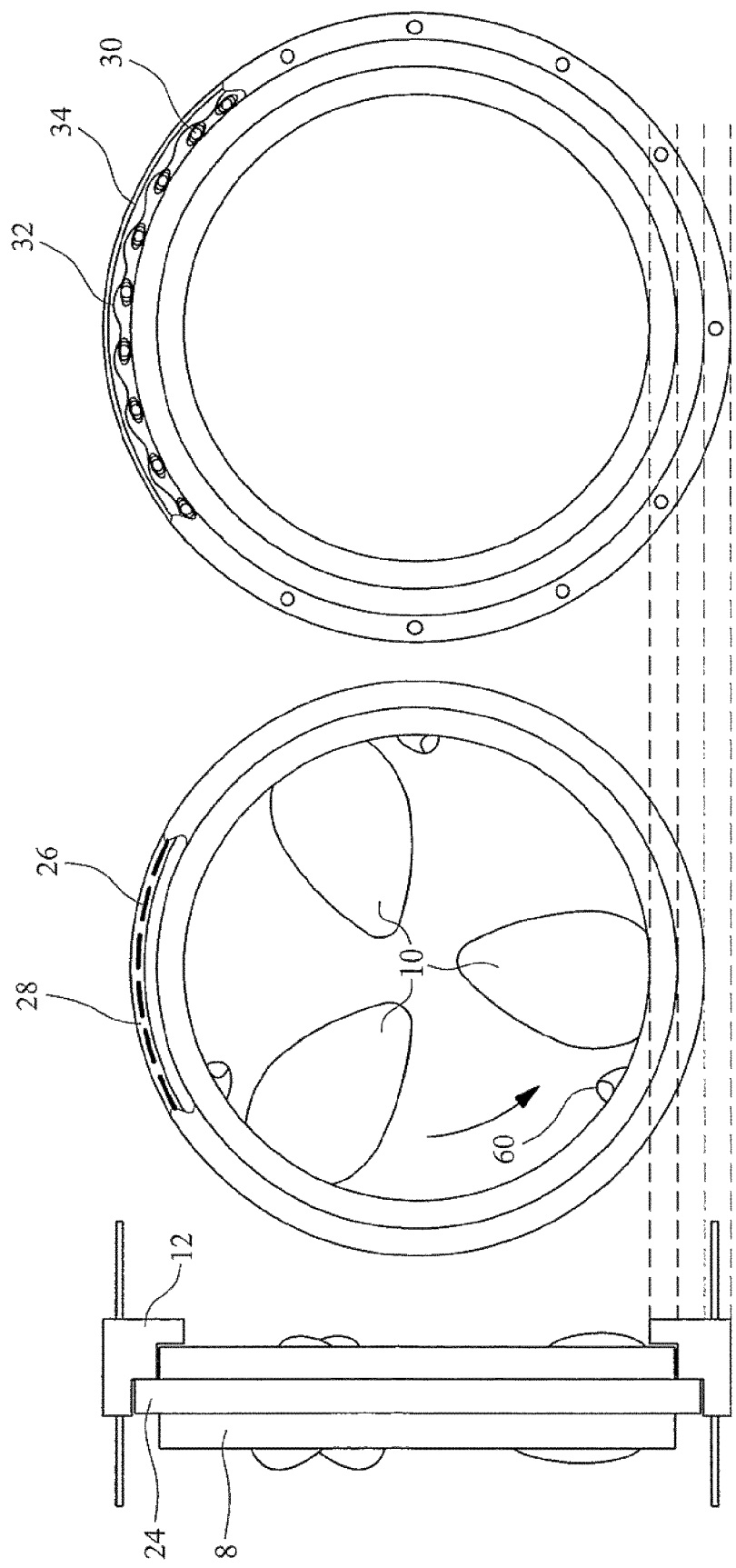

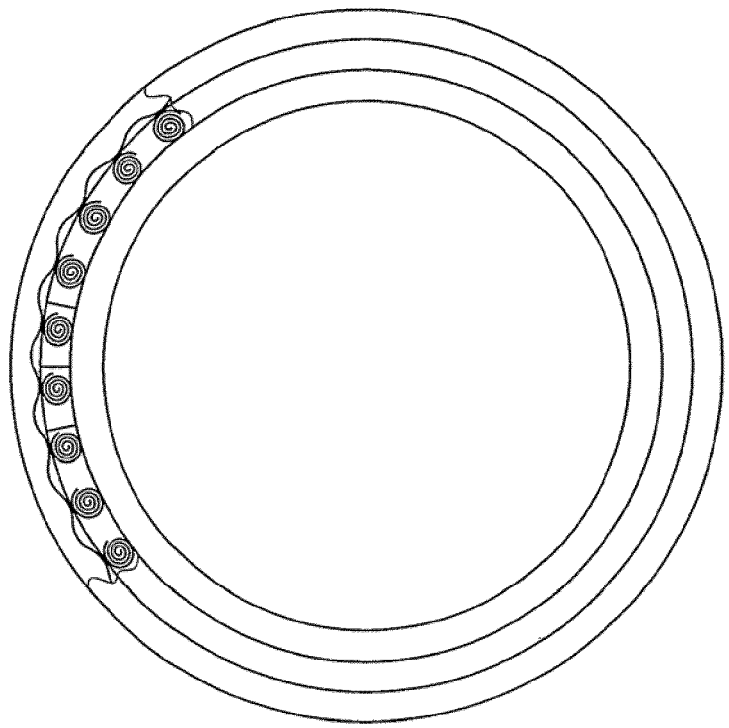
FIG. 3C
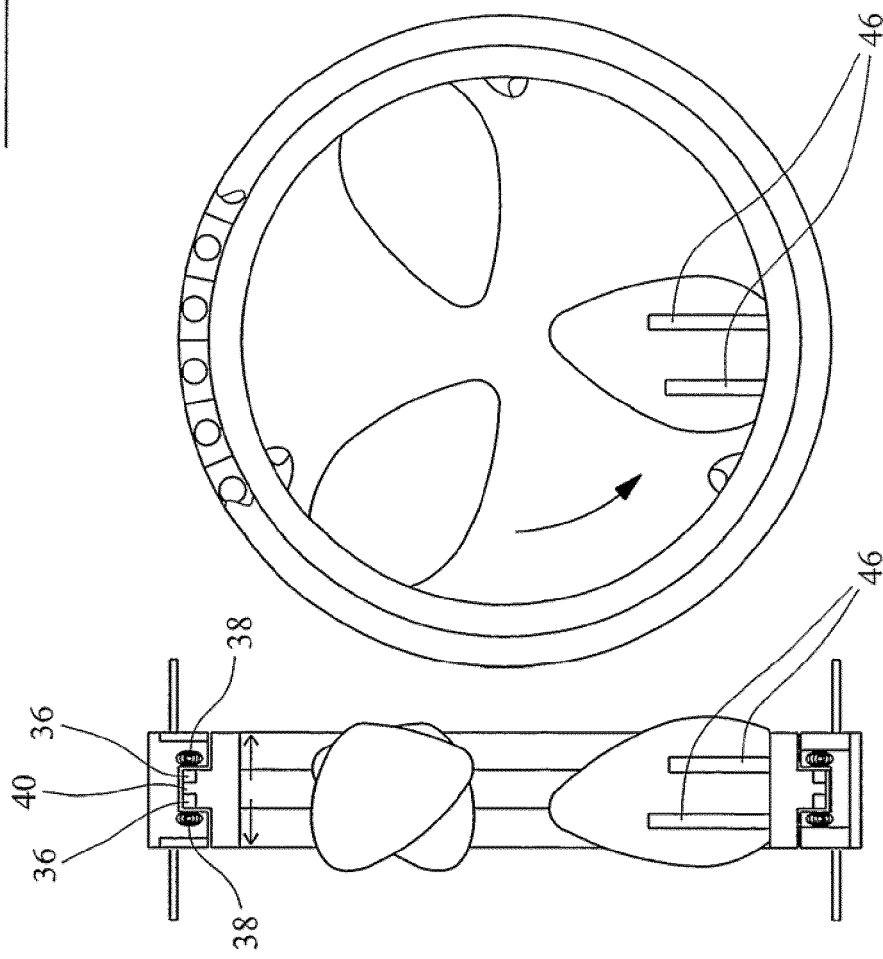
FIG. 3
FIG. 3B
FIG. 3A

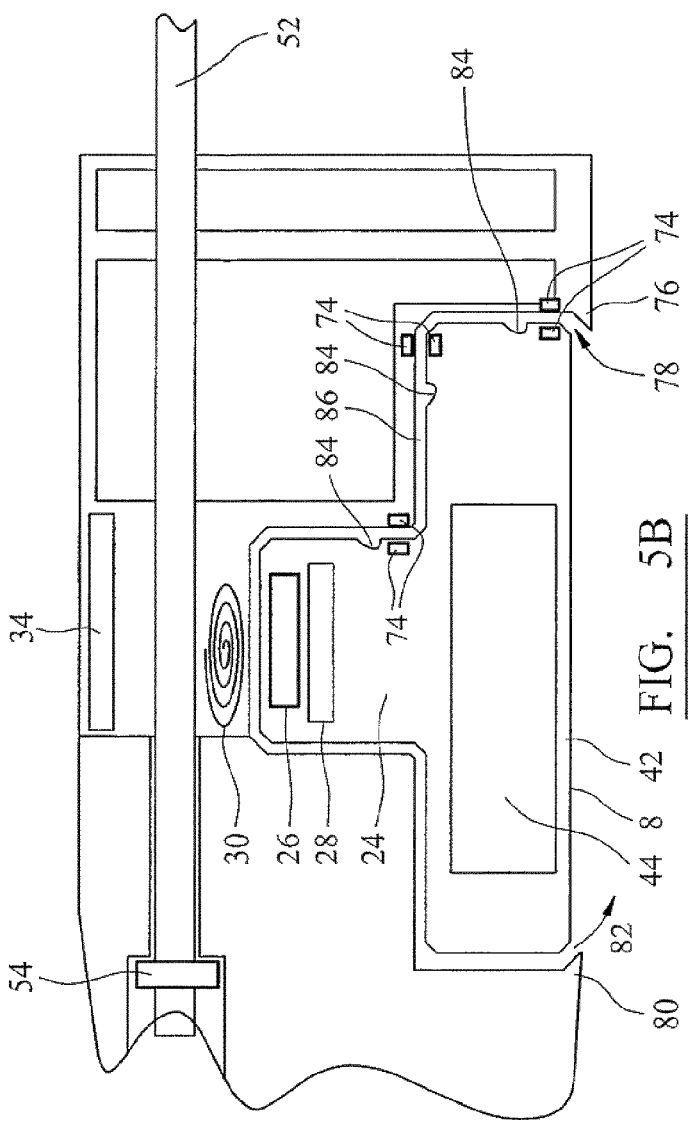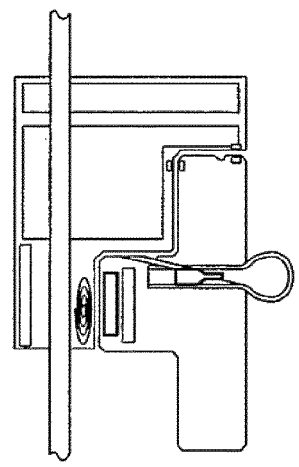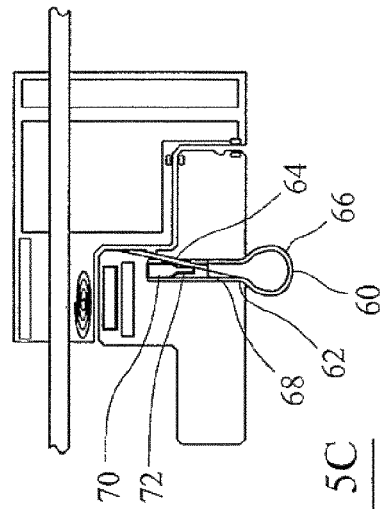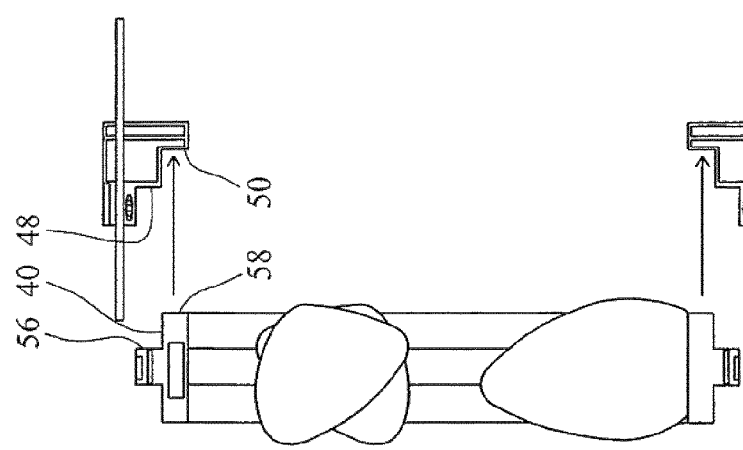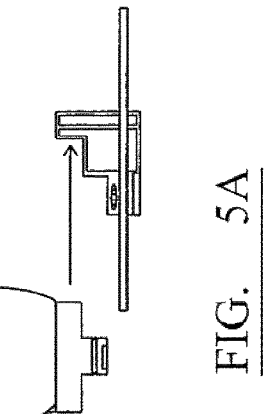

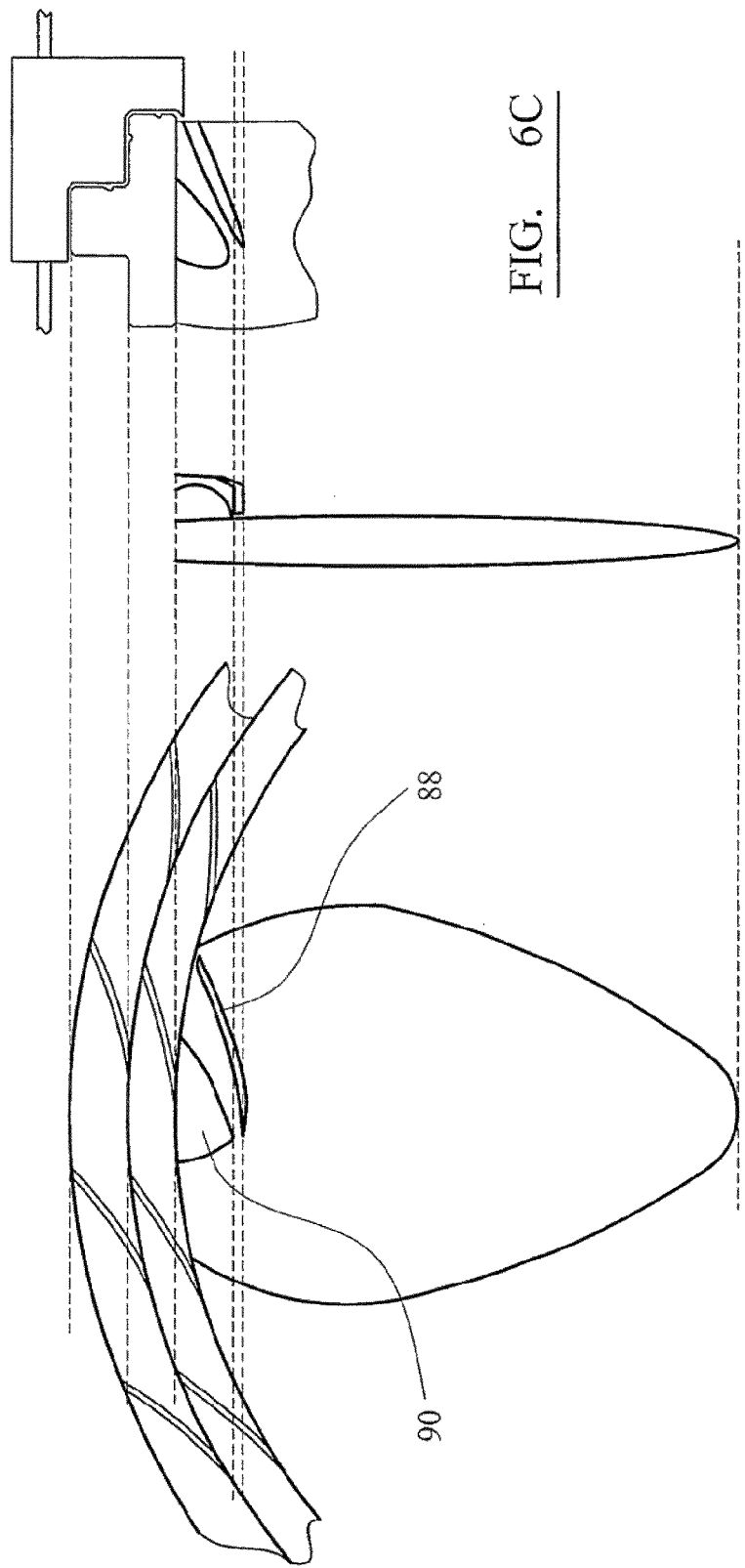

FIG. 7
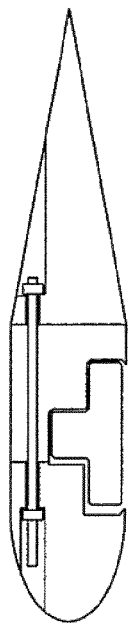
FIG. 7A
FIG. 7B
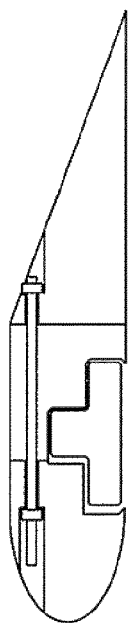
FIG. 7C
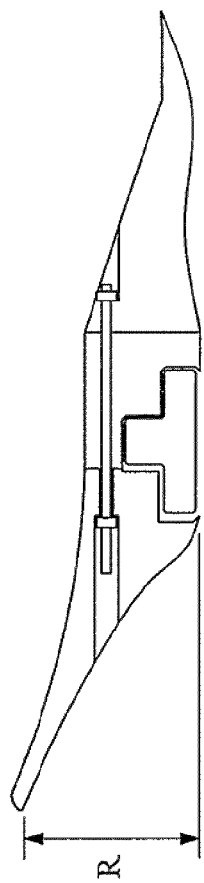
FIG. 7D
FIG. 7E
FIG. 7F
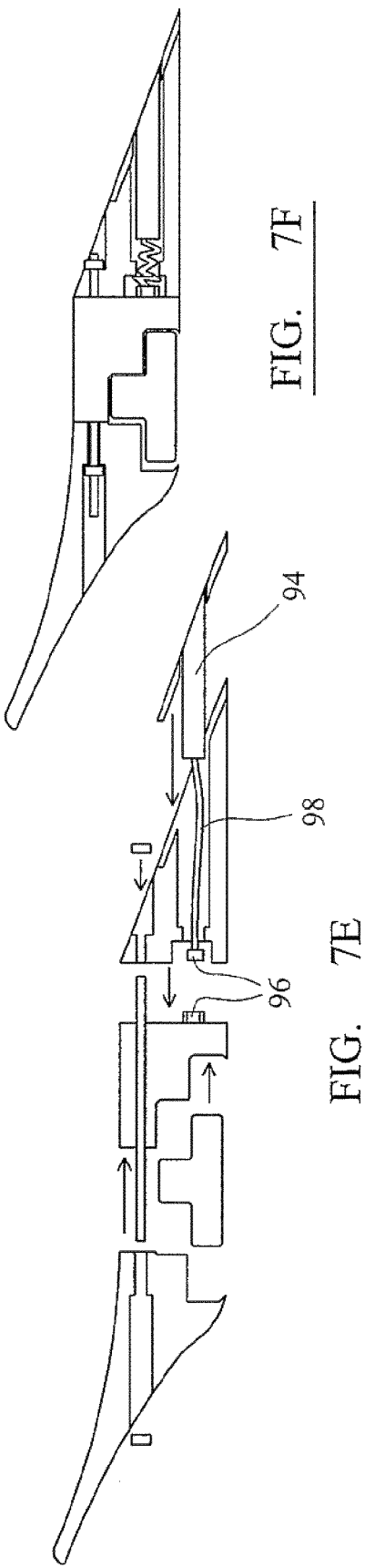

FIG. 8
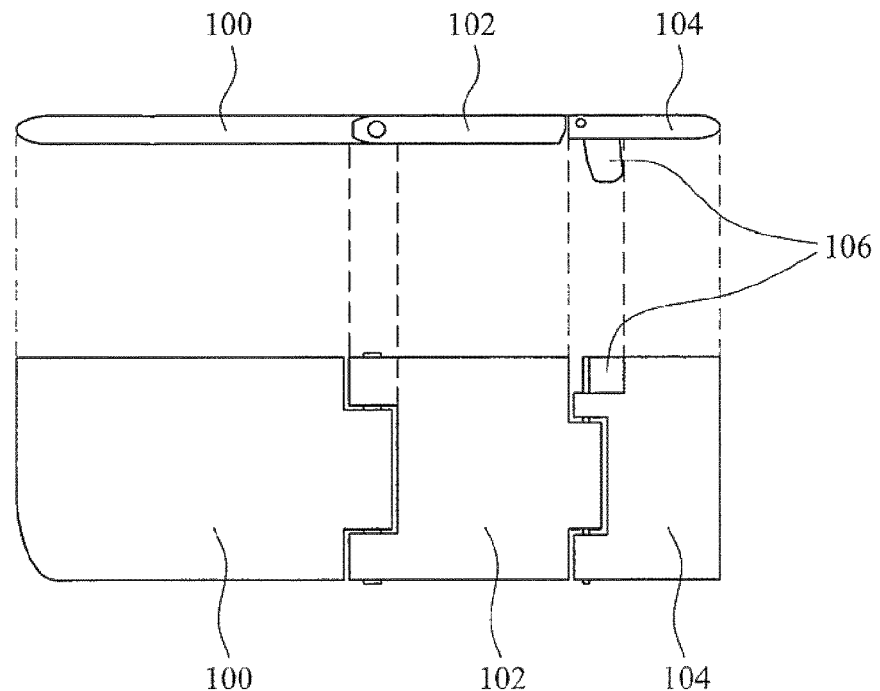
FIG. 8A
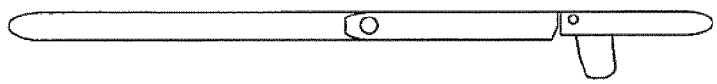
FIG. 8B
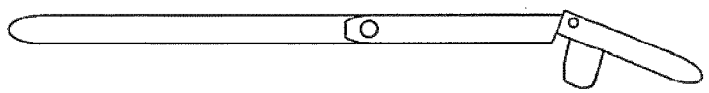
FIG. 8C
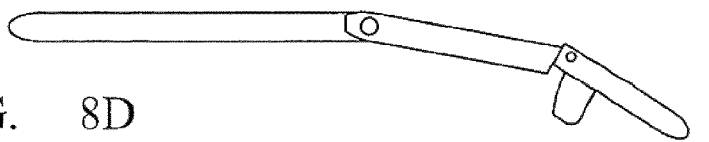
FIG. 8D
FIG. 8E

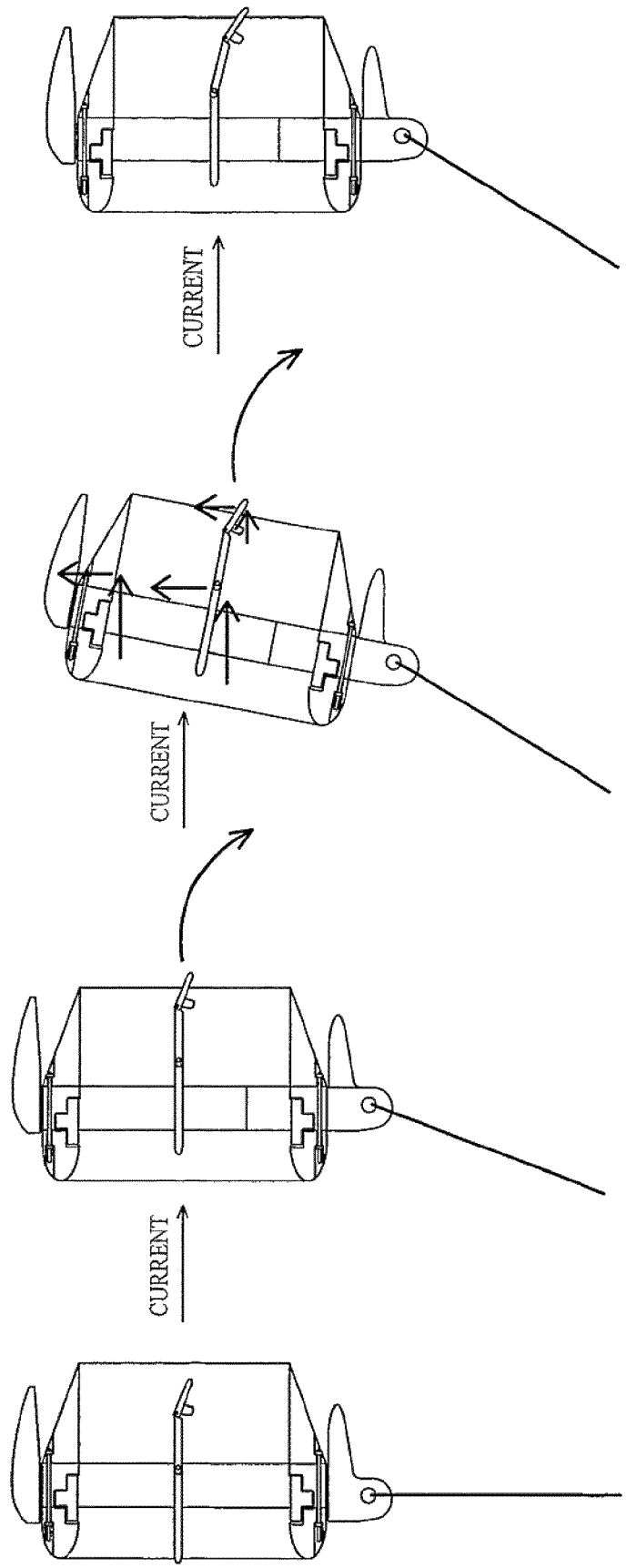

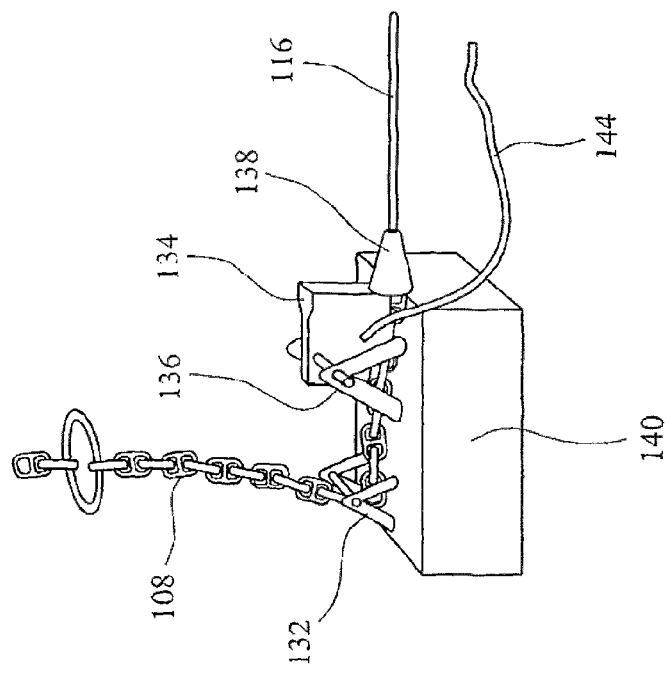
FIG. 14
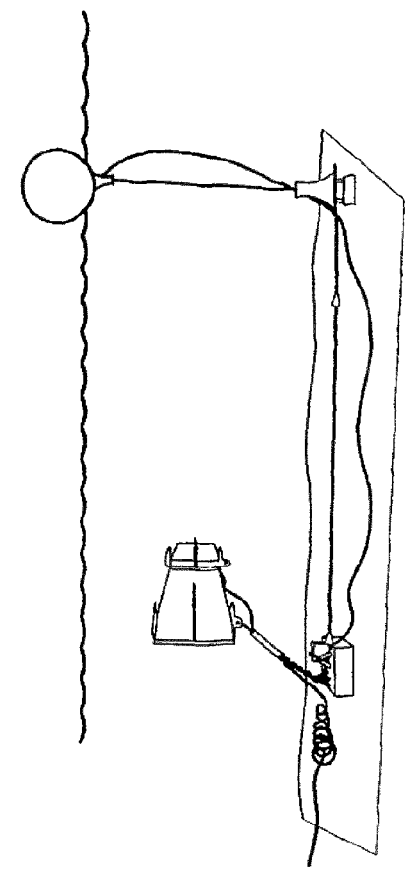
FIG. 14B
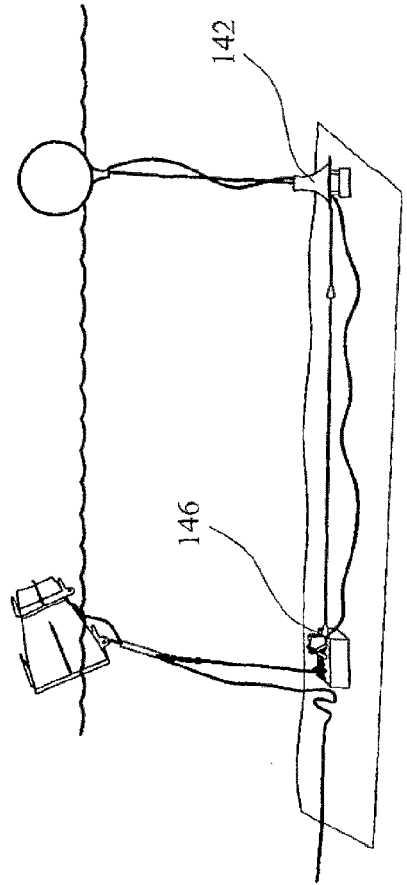
FIG. 14C
FIG. 14A

TIDAL ELECTRICITY GENERATING APPARATUS

The present invention relates to electrical machines, and relates particularly, but not exclusively to electricity generating apparatus for generating electricity from tidal and constant marine currents.

Tidal turbine generators are known in which energy from flowing water drives a turbine to generate electrical power. Although power generation from water currents offers potential for significant energy extraction in relation to device size, the generation of electricity from tidal water suffers from a number of drawbacks, including the complexity and cost of installing and maintaining power conversion devices in water.

One known type of apparatus for generating electrical power from a tidal water flow consists of a turbine having blades of variable pitch connected to a hub, which is connected via a transmission/gearbox system to an electricity generator.

Such apparatus suffers from the drawbacks that it contains a significant number of moving parts, various component parts of the apparatus must be kept out of contact with the water from which the power is generated requiring complex bearing and sealing mechanisms, they generally require heavy fixed platforms for deployment, do not self orient into current direction, cannot easily incorporate power enhancing skirts and power is lost through gearing/transmission losses.

Preferred embodiments of the present invention seek to overcome one or more of the above disadvantages of the prior art.

According to the present invention, there is provided an electrical machine adapted to be constrained within a flow of fluid, the machine comprising:— a stator adapted to be constrained within a flow of fluid;

a rotor defining an aperture and having a plurality of rotor blades protruding from a peripheral region of the rotor into said aperture, wherein the rotor is adapted to be rotatably mounted to said stator such that movement of fluid through said aperture causes rotation of said rotor relative to said stator; and electricity generating means adapted to generate electricity as a result of rotation of said rotor relative to said stator.

By providing a rotor defining an aperture and having a plurality of rotor blades protruding from a peripheral region of the rotor into the aperture, wherein the rotor is adapted to be rotatably mounted to said stator such that movement of fluid through the aperture causes rotation of said rotor relative to the stator, this provides a number of advantages. Firstly, the present invention provides more efficient energy transfer from the flowing fluid to the electricity generating apparatus, since the blades of the rotor of the present invention obstruct fluid flow to a lesser extent than the blades of an apparatus having a hub based rotor. The present invention also has the advantage of having a self centralising rotor involving less frictional interaction with the stator than is the case with an apparatus having a hub based rotor and no or minimal direct contact between rotor and stator as a result of which frictional losses, and the stresses to which the bearing connecting the rotor and stator, of the present invention are less severe than in the case of an apparatus having a hub based rotor and hence wear and maintenance requirement is reduced. The present invention also has the advantage of increasing efficiency of energy transfer compared with a hub based turbine, since the region of highest energy transfer from fluid to blades of the present invention is at the radially outer region of the blades, which can be constructed of larger surface area than the corresponding region of comparable blades of a hub based turbine, because of loading constraints. A further advantage of blades fixed at the outer periphery on a rim which is itself fully enclosed within a housing is that the fast moving 'free' end tip of a conventional hub system blade which is thought to cause most damage to passing animal life is in effect removed. The stator may include at least one funnel for increasing rate of flow of fluid through the rotor.

This provides the advantage of increasing the rate of energy conversion for a given size of machine.

The machine may further comprise aligning means for aligning the machine with the direction of flow of fluid.

This provides the advantage of maximising the efficiency of energy transfer from the fluid to the machine.

The aligning means may comprise at least one first fin.

Part of at least one of said rotor and stator may engage a groove in the other of said rotor and stator.

This provides the advantage of enabling the machine to more reliably withstand stresses on the bearing connecting the rotor and stator.

The machine may further comprise friction reducing means for reducing friction between the rotor and the stator.

This provides the advantages of increasing the efficiency of energy conversion and reducing wear.

The friction reducing means may include fluid directing means for directing fluid between said rotor and said stator.

The fluid directing means may be adapted to scoop fluid from said fluid flow and direct said fluid between said rotor and said stator.

The fluid directing means may include at least one filter.

This provides the advantage of minimising ingress of particles into the gap between the rotor and stator.

The fluid directing means may further comprise particle removal means for removing any particles lodged in the fluid directing means.

The friction reducing means may further comprise fluid flow increasing means for increasing the rate of fluid flow between the rotor and stator.

The friction reducing means may further comprise at least one groove on a surface of at least one of said rotor and stator facing the other of said rotor and stator.

The friction reducing means may include a plurality of mutually repelling first magnets on said rotor and stator.

The electricity generating means may comprise at least one second magnet provided on said rotor and at least one coil on said stator in which electrical current is induced as a result of rotation of the rotor relative to the stator.

The rotor and/or machine may be adapted to be substantially neutrally buoyant within the flow of fluid when the fluid is water.

This provides the advantage of reducing stresses within the rotor and stator and aiding the rotor to self centrally locate within the stator housing.

The machine may further comprise debris directing means for directing debris in said flowing fluid away from the junction between said rotor and stator.

This provides the advantage of causing debris to flow through the rotor without obstructing the bearing joining the rotor and the stator.

The debris directing means may comprise at least one second fin.

The machine may comprise adjusting means for adjusting the orientation and/or depth of the machine in a manner dependent on the rate of flow of fluid.

The adjusting means may comprise at least one third fin adapted to pivot relative to said stator such that the orientation of at least one said third fin relative to the stator depends upon the rate of fluid flow.

The machine may further comprise mooring means for constraining the machine within a body of flowing fluid.

The mooring means may include at least one cable and at least one releasable catch for releasably mounting the machine to the floor of a body of flowing fluid.

At least one said blade may have a respective sacrificial zone.

This provides the advantage of minimising harm to marine life passing through the apparatus, since blades can be designed to break off in the event that they come into contact with marine animals above a certain size.

The machine may further comprise a plurality of mutually repelling third magnets arranged on the rotor and the stator for supporting the weight of the rotor.

The electricity generating means may further comprise at least one solid state component encased within a plastic based matrix.

The machine may be adapted to receive input electricity to cause movement of ambient fluid.

The machine may further comprise a respective gap between distal ends of at least one pair of adjacent said blade.

This provides the advantage that debris in the flowing water becomes trapped inside the rotor to a lesser extent than debris becomes snagged on an apparatus having an outer rim and inner hub fixed rotor. In a similar manner this also increases the size of gaps for marine animals to pass through as well as ushering the marine animals to the central unobstructed hole for onward passage.

At least one pair of adjacent said blades may be connected to each other in the vicinity of proximal ends thereof only.

Preferred embodiments of the invention will now be described, by way of example only and not in any limitative sense, with reference to the accompanying drawings in which:—

FIG. 1A is a side view of a tidal turbine generator embodying the present invention and equipped with a venturi skirt;

FIG. 1B is a view in the direction of arrow A in FIG. 1A;

FIG. 1C is a cross sectional side view of the generator of FIG. 1A;

FIG. 1D is an exploded side view of the arrangement of FIG. 1C;

FIG. 2A shows a side view of a first embodiment of the generator of FIG. 1;

FIG. 2B shows a cutaway front elevation of an inner rim of the generator of FIG. 2A;

FIG. 2C is a cutaway front elevation of an outer rim of the generator of FIG. 2C;

FIG. 3A is a side elevation view, corresponding to FIG. 2A, of a second embodiment of the generator of FIG. 1;

FIG. 3B is a view, corresponding to FIG. 2B, of the generator of FIG. 3A;

FIG. 3C is a view corresponding to FIG. 2C of the generator of FIG. 3A;

FIG. 5A is a side elevation view of a rotor-stator junction of a third embodiment of the generator of FIG. 1 in a disassembled condition;

FIG. 5B is a detailed cross sectional view of part of the arrangement of FIG. 5A in an assembled condition;

FIG. 5C shows details of a lubricating system for use in the arrangement of FIG. 5B in a first condition;

FIG. 5D is a view corresponding to FIG. 5C showing the lubricating system in a second condition;

FIG. 6A is a detailed front view of part of the generator of FIG. 1;

FIG. 6B is a side view of a blade profile of the arrangement of FIG. 6A;

FIG. 6C is a side view of the rotor and stator rim of the arrangement of FIG. 6A;

FIG. 7A to 7F show a series of different possible profiles of the generator of FIG. 1;

FIG. 8A shows a side view of a stabiliser arrangement for use in the generator of FIG. 1;

FIG. 8B is a top view of the stabiliser of FIG. 8A;

FIGS. 8C to 8F shows side views, corresponding to FIG. 8A, of the stabiliser in various positions;

FIGS. 9A to 9D show the operation of the stabiliser of FIGS. 8A to 8F;

FIG. 14A shows a generator of FIG. 1 together with the mooring arrangement when in a submerged condition;

FIG. 14B shows a detail of the mooring arrangement of FIG. 14A;

FIG. 14C is a view corresponding to FIG. 14A showing the generator raised to the water surface;

Figure 4:
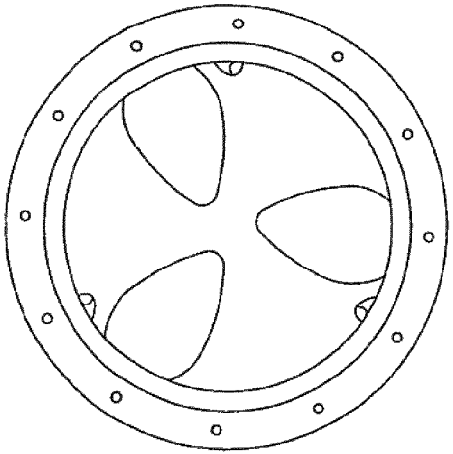
FIGS. 4A to 4F show a variety of possible blade configurations of the generator of FIG. 1.
Figure 4B:
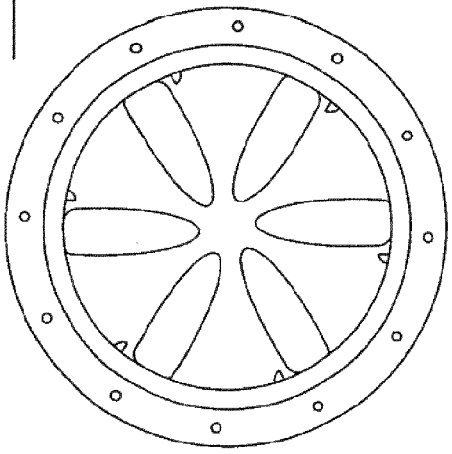
Figure 4C:
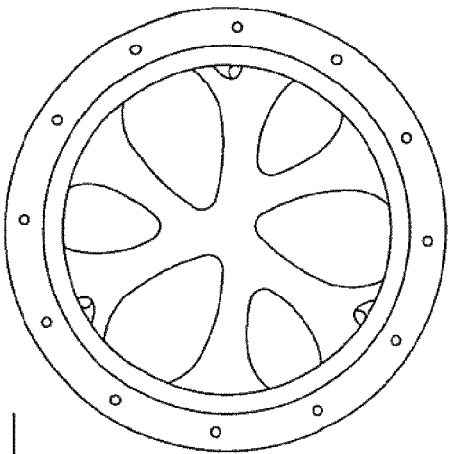
Figure 4A:
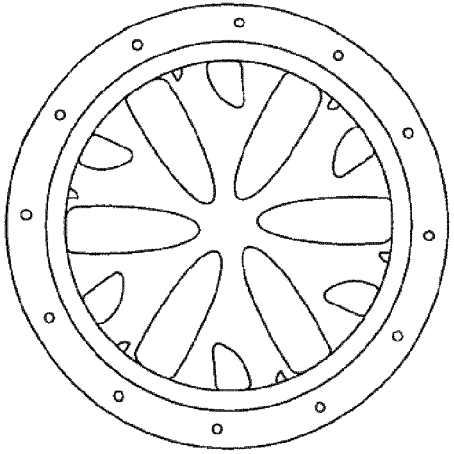
Figure 4E:
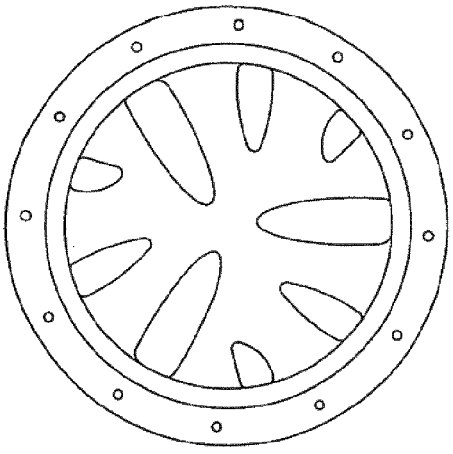
Figure 4F:
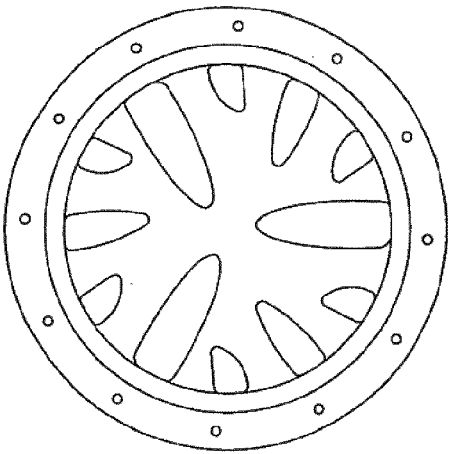
Figure 4D:
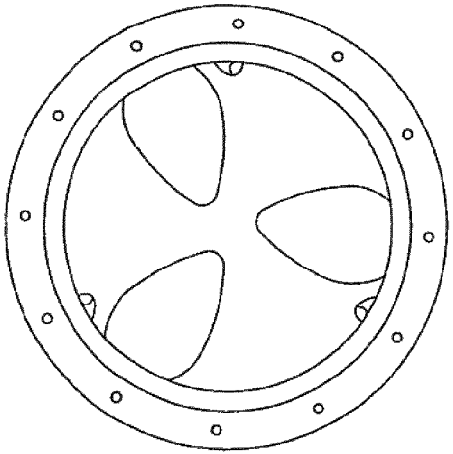

Referring to FIGS. 1A to 1D, a tidal electrical generator 2 comprises a turbine 4 for generating electricity from flowing tidal water, and a venturi skirt 6 for increasing the rate of flow of water through the turbine 4. The turbine 4 includes a rotor having an inner rim 8 and a series of turbine blades 10 mounted around its periphery and extending towards its centre, as best shown in FIG. 2B, and an outer rim 12 for receiving and supporting the inner rim 8. A tail profile 14 and a head profile 16 are attached to the outer rim 12 to improve the hydrodynamic profile of the turbine 4. Alternatively, the head profile 16 or tail profile 14 can be replaced by the venturi skirt 6 attached to the front or rear edge of the outer rim 12, in order to increase the rate of water flow and power transfer to the turbine 4.

The turbine 4 is moored to the seabed (not shown in FIG. 1) by means of a reinforced structure 18 bonded to the outer rim 12 or venturi skirt 6, and vertically arranged straking fins 20 are provided on the reinforced structure 18 and on the opposite side of the venturi skirt 6 or outer rim 12 from the reinforced structure 18. Horizontal straking fins 22 are provided on opposite sides of the venturi skirt 6 or outer rim 12. The purpose of the straking fins 20, 22 is to provide stability to the turbine 4 in the current, and to ensure that the turbine 4 remains aligned with the flowing water.

Referring now to FIGS. 2A to 2C, the inner rim 8 is provided with a raised section 24 which is accommodated within a recess on the outer rim 12 such that there is a small gap between the inner rim 8 and the outer rim 12. A series of magnets 26 is placed around the outer edge of the raised section 24 of the inner rim 8, and a base plate 28 of rolled steel is provided underneath the magnets 26. The outer rim 12 is provided with a series of stator coils 30 aligned closely with the magnets 26 of the inner rim 8, the coils 30 being connected together by single or multiple connecting wires 32. A laminated steel plate 34 is arranged on the outside of the coils 30.

The turbine 4 is arranged such that as water moves axially through the turbine 4, the inner rim 8 is caused to rotate relative to the outer rim 12. As a result, the magnets 26 of the inner rim 8 pass a small radial distance from the coils 30 of the outer rim 12, thereby inducing a current in the coils 30. By suitable arrangement and connection of the coils 30, a single phase, three phase, five phase or other multi-phase generator can be constructed. The purpose of the rolled steel plate 28 is to connect the lines of magnetic flux directly between the magnets 26, and the purpose of the laminated steel plate 34 is to enhance the magnetic flux through the coils and limit the extent of the alternating magnetic flux in the outer rim 12 to minimise the extent to which magnetic flux leaks from the generator 4.

Referring to FIGS. 3A to 3C, an alternative arrangement of the turbine 4 is shown in which two sets of magnets 36 arranged on the inner rim 8 run past two sets of coils 38 arranged in the outer rim 12, and a balanced power takeoff is arranged about the raised section 40 of the inner rim 8.

The arrangement shown in FIGS. 1 to 3, in which the turbine blades 10 are mounted to the inner periphery of the inner rim 8 and protrude towards the axis of the rotor, has the advantage of removing any central constraint on the shape, position, angle or number of blades 10 used. Referring in particular to FIGS. 4A to 4F, a range of possible blade configurations is shown, for example the blades 10 being arranged in sets of three for balance (or multiples thereof), evenly distributed about the periphery of the swept area of the turbine 4 and connected to the inner rim 8.

It will be appreciated by persons skilled in the art that an advantage of having the possibility of variable arrangements of blades 10 around the rim 8 is that it is possible to provide blades designed for different purposes. For example, three main blades 10 can be provided, at 12 degrees angle of attack, which extend almost all of the way to the centre of the rotor and which are the main "power" blades of the rotor. Three smaller blades could then be provided, for example, which only go halfway or a third of the distance towards the centre of the rotor and are at a higher angle of attack, say 18 degrees. These blades would thus generate more rotational torque at lower water speed and would act as "start up" blades to get the rotor moving and generating some power earlier than the "power" blades. As the water speed increases, the "power" blades 10 take over and the contribution from the "start up" blades becomes less significant.

With higher attack angle blades, the twisting forces on the blades 10 are greater, and they therefore either need to have a stronger attachment area to the rim. Having shorter blades also reduces the twisting forces against the anchor point.

Such an arrangement can serve to provide a flatter power output against water speed curve and equally importantly increase the total area under the curve (i.e. generate more total power over the tidal cycle) and enable the 'cut in' speed at which the rotor generates power to be reduced.

It may also be possible to provide a third set of blades with shallower angle for flattening out the power curve even more in the highest water speed range. The possibility of providing different types of blades 10 there has uses in a number of potential installations, For example, in some installations, the ebb and flow currents are markedly different (strength of max current, length of tidal cycle above a nominal 'cut in' speed).

A further advantage resulting from the connection of the blades 10 to the outer swept area of the turbine 4 is that this is the region where a substantial proportion of the energy transfer from fluid to blades 10 occurs. With conventional hub based turbines, the outer reaches of the swept area are reached only by the tip of the blades, which would normally be constructed more thinly than preferred as a result of loading constraints at the tip of long blades anchored on a central hub. Although more blades can be placed on the hub of a hub based rotor to harvest more energy from the outer rim, the blade thickness at the base of the blade can constrict the flow of water in the centre of the rotor without converting energy. In addition, none of the useful rotor swept area of the turbine 4 of the present invention is obstructed by non-power converting apparatus such as a central hub. Furthermore, as shown in particular in FIG. 7B, by having the front facing section of the turbine 4 hydrodynamically faired, the head of the turbine increases the nominal swept area of the turbine 4 to the mid point of the head as water power from this additional area (mid point of the head towards the centre of the rotor) is forced through the turbine 4.

A further advantage of having a fixed inner rim 8 rotating with the blades 10 is that the anchor position of the blades 10 to the rim 8 is coincident with the area of maximum power transfer of water to rotor. This attachment point can therefore be constructed as strongly as is required at the points where the largest stresses are generated, which is the opposite of the case of a central hub based system. In addition, the unimpeded aperture at the centre of the turbine 4 maintains a flow of fluid through the turbine 4 and keeps the turbine 4 operating below its Betz limit. It will be appreciated by persons skilled in the art that above the Betz limit of 59.6% energy conversion the turbine 4 excessively restricts fluid flow and the turbine therefore no longer operates.

A further advantage of the aperture at the centre of the turbine 4 is to allow debris and marine animals within the tidal stream to flow through the blades 10 without damage or being caught on the blades 10. This can further be minimised by providing a rear-facing rake on the blades 10 which then encourages debris to move to the central aperture which can then be ejected from the turbine 4. Furthermore, any debris snagged on the blades 10 will tend to become released from the blades 10 as rotation of the turbine 4 slows with slowing current. Furthermore, at slack tides, the whole turbine 4 will partially invert, which further aides removal of debris.

The inner rim 8 provided with the rotor blades 10 is designed to be neutrally buoyant, in order to reduce stresses within the assembly formed by the inner 8 and outer 12 rims and ensure that the inner rim 8 does not tend to rest on the base (if it is heavier than water) or top (if it is lighter than water) of the outer rim 12, which could cause stresses or wear between the inner rim 8 and the outer rim 12.

With reference to FIGS. 5A to 5D the inner rim 8 comprises an outer skin 42 of fibre reinforced plastic material and some low density core material 44 to provide neutral buoyancy to the structure as a whole and balanced weight distribution around the inner rim 8. The blades 10 can be manufactured from a number of suitable materials which will be familiar to persons skilled in the art to meet stress and loading requirements, including aluminium, bronze, fibre reinforced plastic material (including carbon fibres), or fibre reinforced plastic skins over a suitable foam core. The blades 10 can be attached to the rim 8 by means of studs, bolts, lamination, adhesive or any suitable combination, for example, by means of a series of studs 46 as shown in FIGS. 3A and 3B, and may additionally be bonded by means of epoxy resin.

It is possible to incorporate blades 10 fabricated with sacrificial zones which would facilitate snapping off to aid the passing of large marine animals. This could comprise faults lines which become progressively weaker toward the centre of the rotor.

With blades being sacrificial, a preferred version of this invention would allow the blades to be individually easily replaceable. This could be achieved by quick fixing techniques about the studs 46, or alternatively with each blade on an individual base (with each individual base being the same dimension regardless of blade design) which itself is fixed to a standard sized recess on the rotor rim, or by other suitable means familiar to persons skilled in the art.

As a result, the inner rim 8 floats freely within the cavity created by the shape of the outer rim 12, and the inner rim 8 is pushed against faces 48, 50 of the outer rim 12 by the force of water flowing through the turbine 4.

Non magnetic metallic threaded studs 52 are set within the outer rim 12 for mounting the various types of head and tail sections to the turbine 4 by means of non-magnetic nuts 54. The outer rim 12 is generally arranged to be positively buoyant for floor anchored turbine systems, but could also be neutrally buoyant with external floats to raise the turbine 4 off the sea floor and into the current stream. Alternatively the outer rim 12 could be generally negatively buoyant for barge moored turbine systems, or could be neutrally buoyant with external weights to take the turbine 4 below the surface and into the current stream.

During operation of the turbine 4, the force of the water stream passing through the turbine 4 presses faces 56, 58 of the inner rim 8 against thrust plane surfaces 48, 50 of the outer rim 12 respectively. In order to reduce the friction at this bearing, the surfaces 48, 50, 56, 58 are preferably kept distant from one another and are also coated with a highly abrasion resistant and low coefficient of friction material.

In addition, a water scoop 60 as shown in FIGS. 5C and 5D placed on the inner edge of the inner rim 8 faces into the direction of rotation of the rotor and scoops water and transmits it through a narrowing funnel arrangement 62 into a tube 64 within the inner rim 8 and out into the gap between the surfaces 48 and 56 to lubricate the bearing. The scoop 60 is provided with wires 66 which prevent ingress of particles into the scoop 60, which may be alternatively angled slightly towards the rear facing edge of the inner rim 8, as a result of which any large particles are deflected past the scoop 60.

The tapering construction of funnel 62 increases the speed of water being injected, while the/arrangement of the opening coupled with the fast moving nature of the water in the gap between the two rims 8, 12 creates a low pressure zone, which causes water to be sucked in from the scoop 60 and funnel 62. In the event that any particles should penetrate scoop 60 and funnel 62, then if they are smaller than funnel exit hole 68 they will exit into the thrust bearing and be swept away with the water flow, and if they are larger than the exit hole 68 they become trapped. However, when the turbine 4 slows with decreasing water current, a dart head 70, which under normal operation of the turbine 4 is forced to the top of its allowed movement channel 72, is able to fall under the influence of gravity such that the dart head 70 penetrates the funnel exit hole 68. With each subsequent revolution of the rotor, the dart head 70 moves up and down along its allowed channel with increasing force until the dart head 70 ultimately dislodges any particles stuck in the funnel 62, as shown in FIG. 5D.

Lubrication of the bearing between the inner 8 and outer 12 rim is further assisted by a series of same-pole magnets 74 placed around opposing parts of the inner 8 and outer 12 rims which help to ensure the rims remain distant from one another and water fills the consequent gap to aid lubricity. The magnitude of the repulsive force between the magnets 74 increases as the two bearing surfaces are forced closely together and ensures that the inner rim 8 rotates freely and is centralised within the outer rim 12 to minimise wear and drag between the two bearing surfaces.

An overhang feature 76 provided on the outer rim 12 protrudes into the water current and directs the stream of water into the thrust plane between surfaces 50, 58. This creates a high pressure region which forces water into thrust plane 78 to thereby lubricate the bearing. An opposite overhang 80 on the head at the front of the turbine 4 forces the incoming water stream to pass quickly over the leading edge of the inner rim 8, which creates a low pressure area which sucks water 82 out of the bearing region to aide circulation of lubricating fluid through the bearing.

A series of grooves 84 provided on thrust faces and upper face 86 of the inner rim 8 cause water to be pulled into the rim 8, which encourages flow of water around the thrust bearing seat, and aides lubrication of the bearing.

Referring now to FIG. 6A to 6C, a shaped fin 88 is fixed onto each blade 10 and scoops water under positive pressure, generated by the speed of the rim 8, into the rim bearing through the opening around edge 78, and obstruction 90 is an impediment to any large debris in the water stream, causing it to be deflected back into the current flow and away form the bearing. This leaves a clean stream of accelerated water to pass into gap 78 to lubricate the bearing.

Referring to FIGS. 7A to 7F, a variety of hydrodynamic profiles are shown.

FIG. 7A shows a hydrodynamically faired head section which directs the water stream evenly and smoothly over the leading edge of the turbine 4. The tail has a flat inner profile parallel to the inner rim diameter, and alternative tail sections as shown in FIGS. 7B and 7C can be used. Alternatively, different head sections as shown in FIG. 7C can be used in order to expand the water entry area for the turbine 4 by radial distance R to in effect create a smaller version of the venturi skirt 6 of FIG. 1. The head and tail arrangements can be fabricated in the single section, or can be formed in multiple sections around the rim of the turbine 4 and mounted to the outer rim 12 by means of studs and bolts. Also, as shown in FIG. 7D, a quick release mechanism 92 can fix the front and back sections over the outer rim 12. The head and tail sections can be used to accommodate control electronics 94 connected to the outer rim by connectors 96 via cable 98.

A self aligning arrangement for the turbine 4 is shown in FIGS. 8A to 8F. In order to optimise power output, the turbine 4 should be arranged roughly along the direction of the incoming water current, although it will be recognised by a person skilled in the art that a skirted turbine is tolerant to water current up to 40 degrees off axis. However, at slack tide, the turbine 4 can be arranged to rotate horizontally into the new current and with suitable hydrodynamic profiling of the turbine 4 and location of the anchor point, the inertial moment acting at the centre of the rotor rotates the rotor about the mooring point as shown in FIGS. 9A to 9D. For horizontal alignment a fixed side blade 100 attached to the outer rim 12 and having a pivot point at its rear on which an elevator blade 102 is connected in turn pivotally at its rear to a tail blade 104 which has a weight 106 which under the influence of gravity tends to flip the tail down. Depending upon the strength of the current, the combined action of this weight and the current on the tail will either force the elevator blade 102 up or down amplifying its effect, generating a self correcting stabilising lift for the turbine 4 to help ensure that it is aligned into the tidal stream irrespective of current strength.

Figure 10:
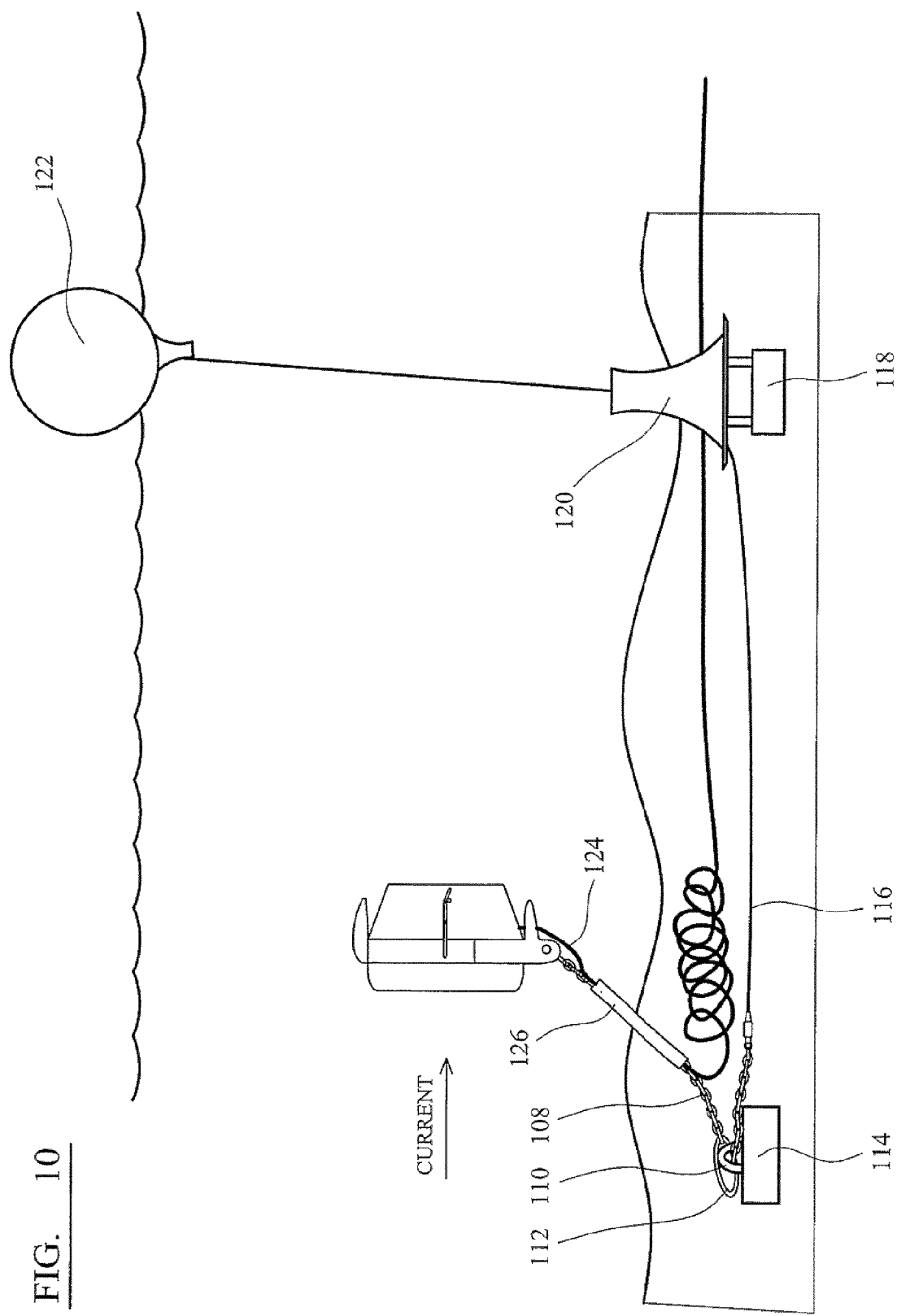
FIG. 10 shows a first mooring arrangement of the generator of FIG. 1 with the venturi funnel/skirt absent.

FIG. 10 shows a sea floor mooring system in which the anchor point is connected to a mooring chain or rope 108. The chain 108 passes through a sea floor anchored loop 110 until an enlarged loop 112 becomes wedged against an anchor stop 114. The chain 108 is then connected to a conventional marine rope 116 which passes through an anchor point 118 including an inverted hopper 120 to reduce bending stresses on the rope 116 and then to the surface where it is connected to a floating surface buoy 122.

An electrical take-off 124 exits from the outer rim 12 of the turbine 4 and is attached with some slack in the electrical cable to the chain 108 by means of a sleeve 126. The cable 124 then passes directly to the shore.

Figure 11:
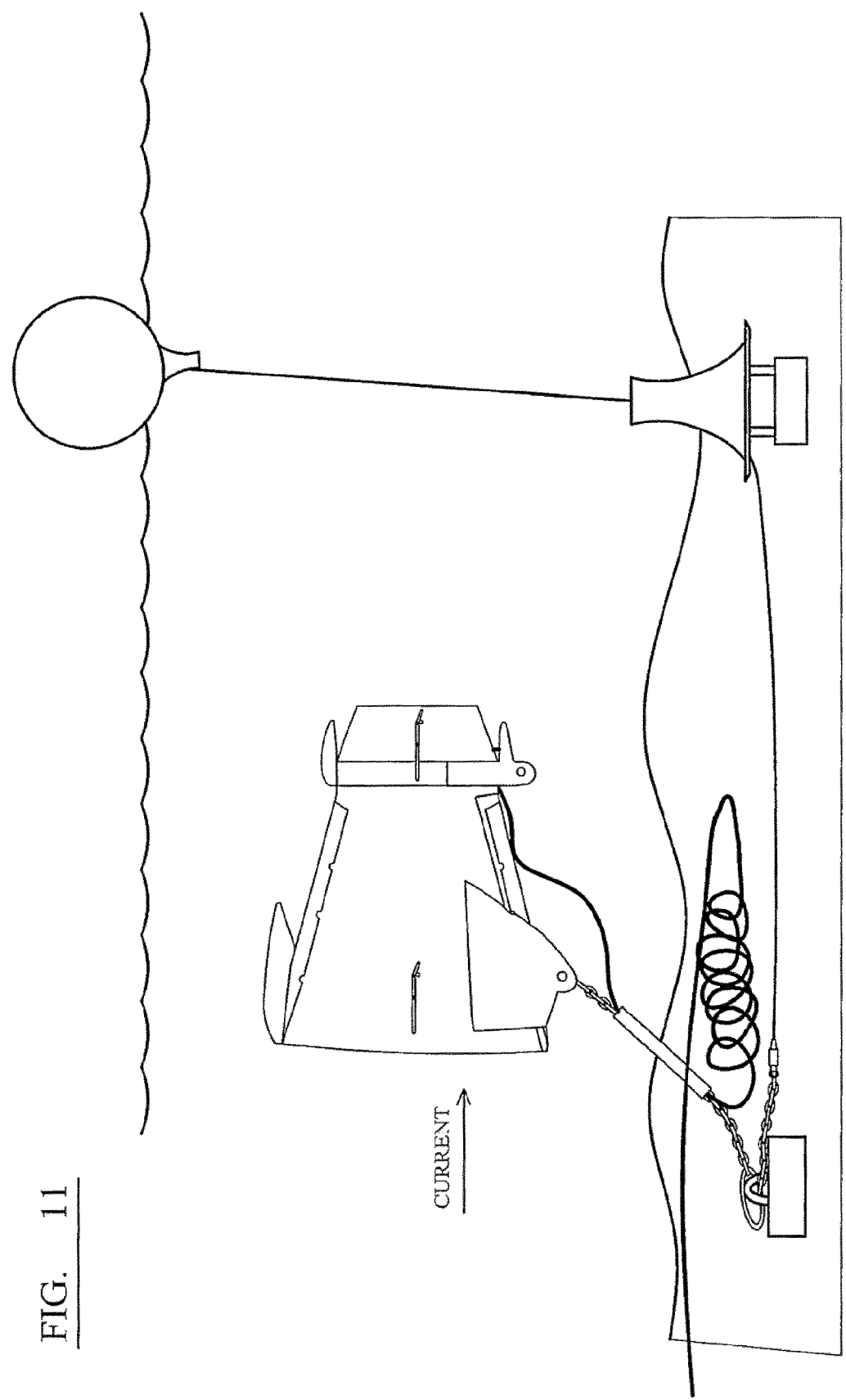
FIG. 11 shows a mooring arrangement, corresponding to FIG. 10, of the generator of FIG. 1 equipped with a venturi funnel/skirt.

In order to retrieve the turbine 4 shown in FIG. 10, a vessel disconnects the anchor rope 116 from the buoy 122 and feeds the rope 116 out. The positive buoyancy of the turbine 4 brings it to the surface to facilitate in-situ maintenance, and the rope 116 can then be reconnected to the buoy 122 and the same vessel can carry out maintenance operations on the turbine 4. This does not require sub-sea intervention, which makes the maintenance operation safer, quicker and possible with a single relatively small and thus less costly vessel. FIG. 11 shows a similar arrangement equipped with the Venturi skirt 6 of FIG. 1.

Figure 12:
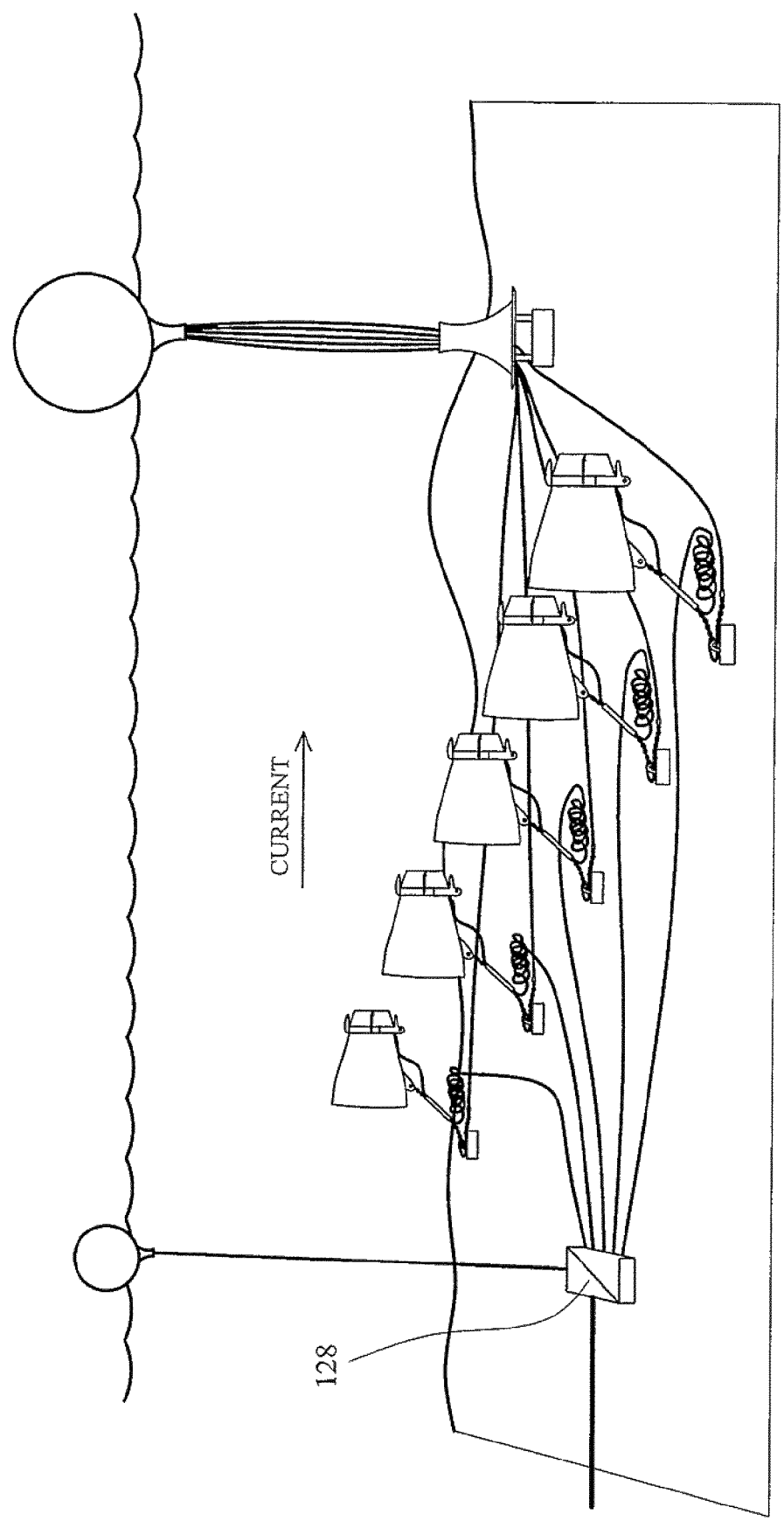
FIG. 12 shows a first arrangement for mooring multiple generators of the type shown in FIG. 1.
Figure 13:
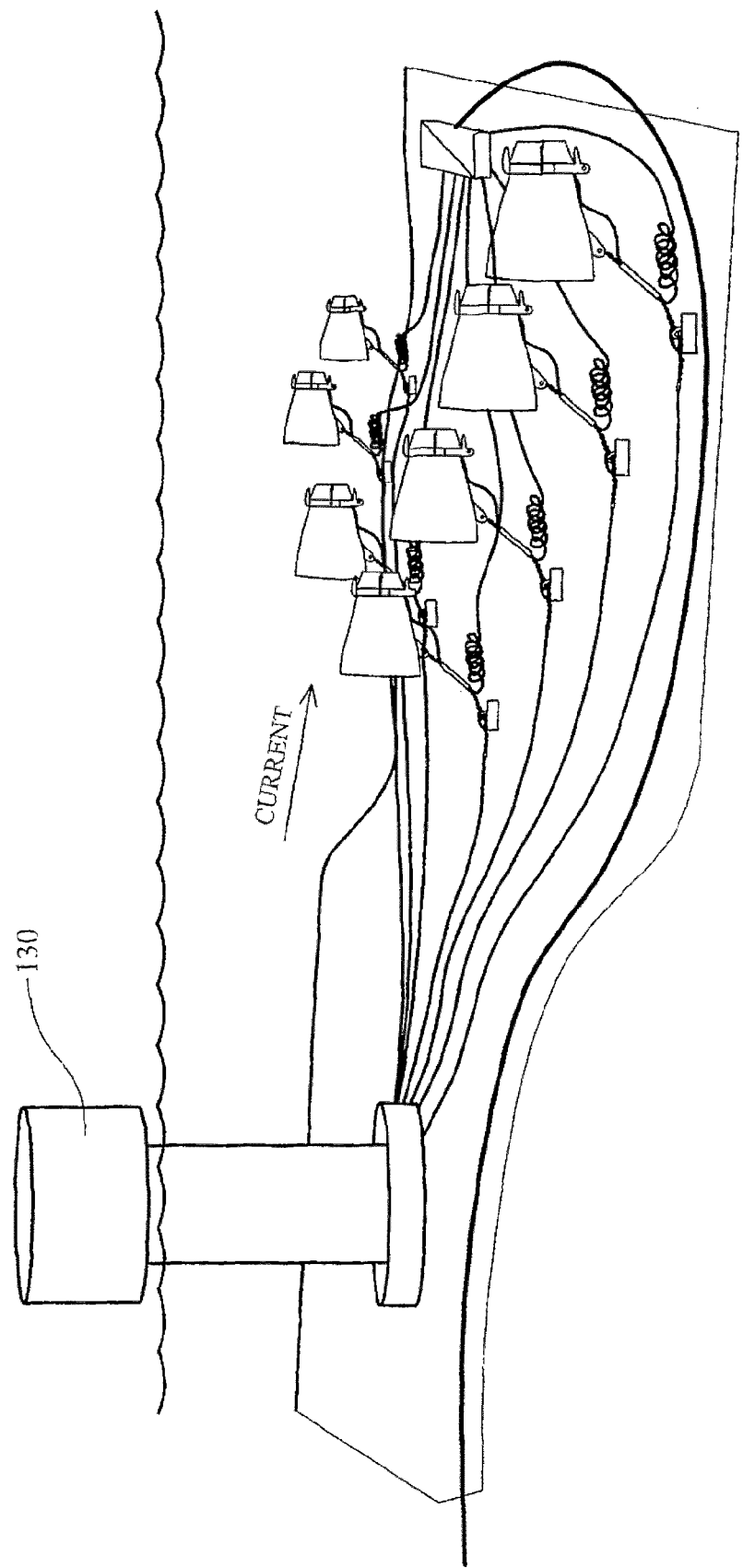
FIG. 13 shows a second arrangement for mooring multiple generators of the type shown in FIG. 1.

An alternative arrangement for mooring multiple turbines is shown in FIG. 12, in which an electrical collection/synchronisation unit 128 is shown. Alternatively, as shown in FIG. 13, the turbines could be anchored individually and then connected centrally to a monopile structure 130 located in relatively shallow water.

A mooring mechanism for the turbine 4 is shown in FIGS. 14A to 14C. In the mooring mechanism shown, the mooring chain 108 is fed through a guide rail 132 and then under a safety catch 134 attached to a pivot mechanism 136. In normal operation, a stop 138 on the mooring rope 116 is caught against the safety catch 134 and the anchor base 140 to prevent any further slippage of the anchor chain or mooring rope through the turbine sea anchor. As a result, the full drag load of the turbine 4 is supported directly by its individual sea anchor. As a result, a central hopper 142 is only required to support the forces generated by a turbine being retrieved or deployed, and can consequently be much smaller than would otherwise be necessary to support a plurality of turbines simultaneously.

In order to release the catch, the strain on the mooring rope is taken up by a support vessel at the surface via a central anchor 142, and catch release rope 144 is then pulled to lift the safety catch 134. With the safety catch 134 lifted, the mooring rope is played out to allow the turbine 4 to float to the surface, and after the mooring rope has safely passed the feed guide, the safety catch 134 is allowed to fall to arrest the mooring ropes movement at stop point 146.

Figure 15:
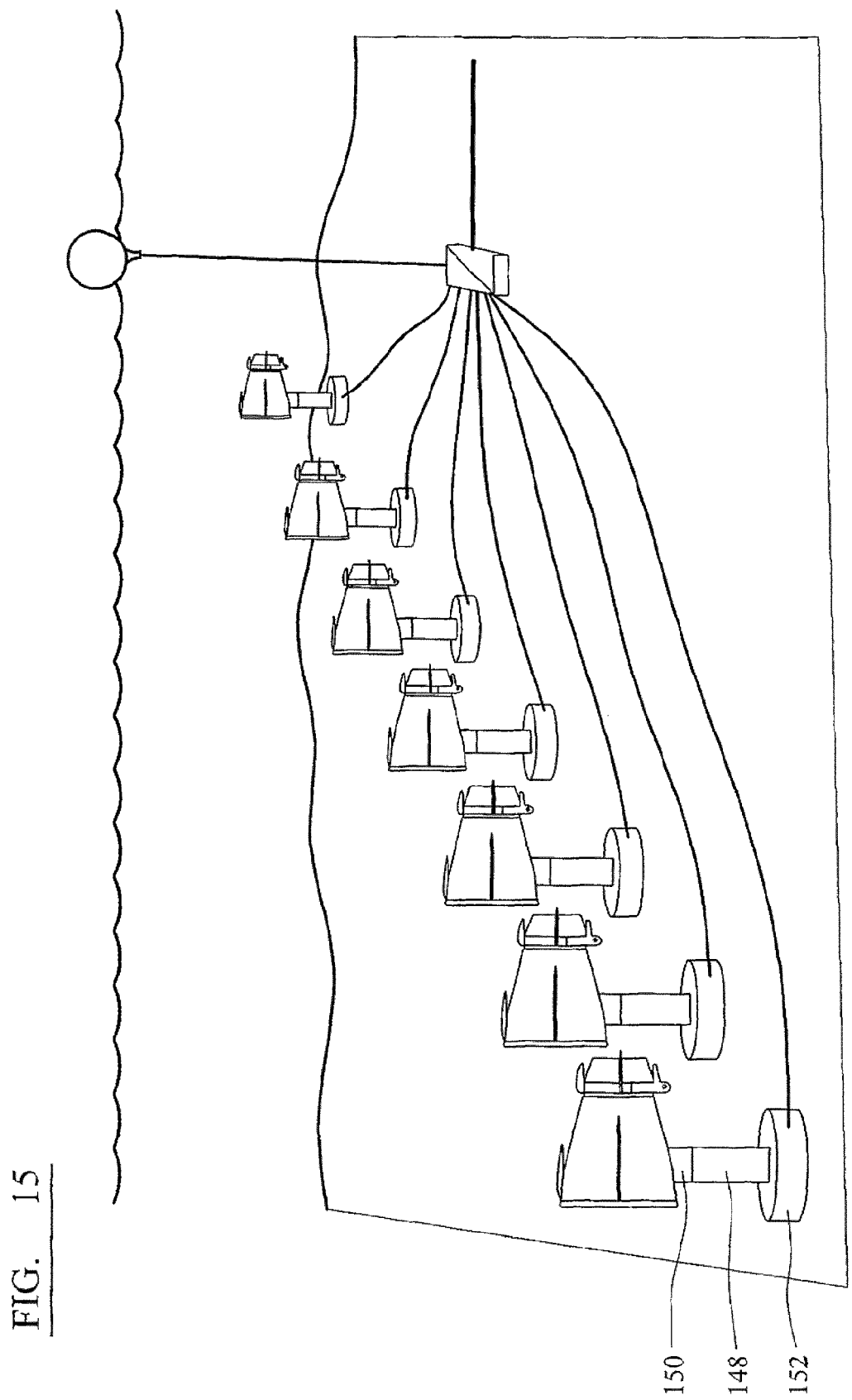
FIG. 15 shows a monopile mooring arrangement of a plurality of the generators shown in FIG. 1.

An alternative arrangement is shown in FIG. 15, in which each turbine is connected either at the base of the turbine outer rim 12 or on the base of the venturi skirt 6 via a swivel connector which sits on top of a pivot pole 148 supporting a connector 150 and securely fixed into a gravity anchor structure 152 so that the turbine 4 can pivot and self orient into an incoming tide.

Figure 16:
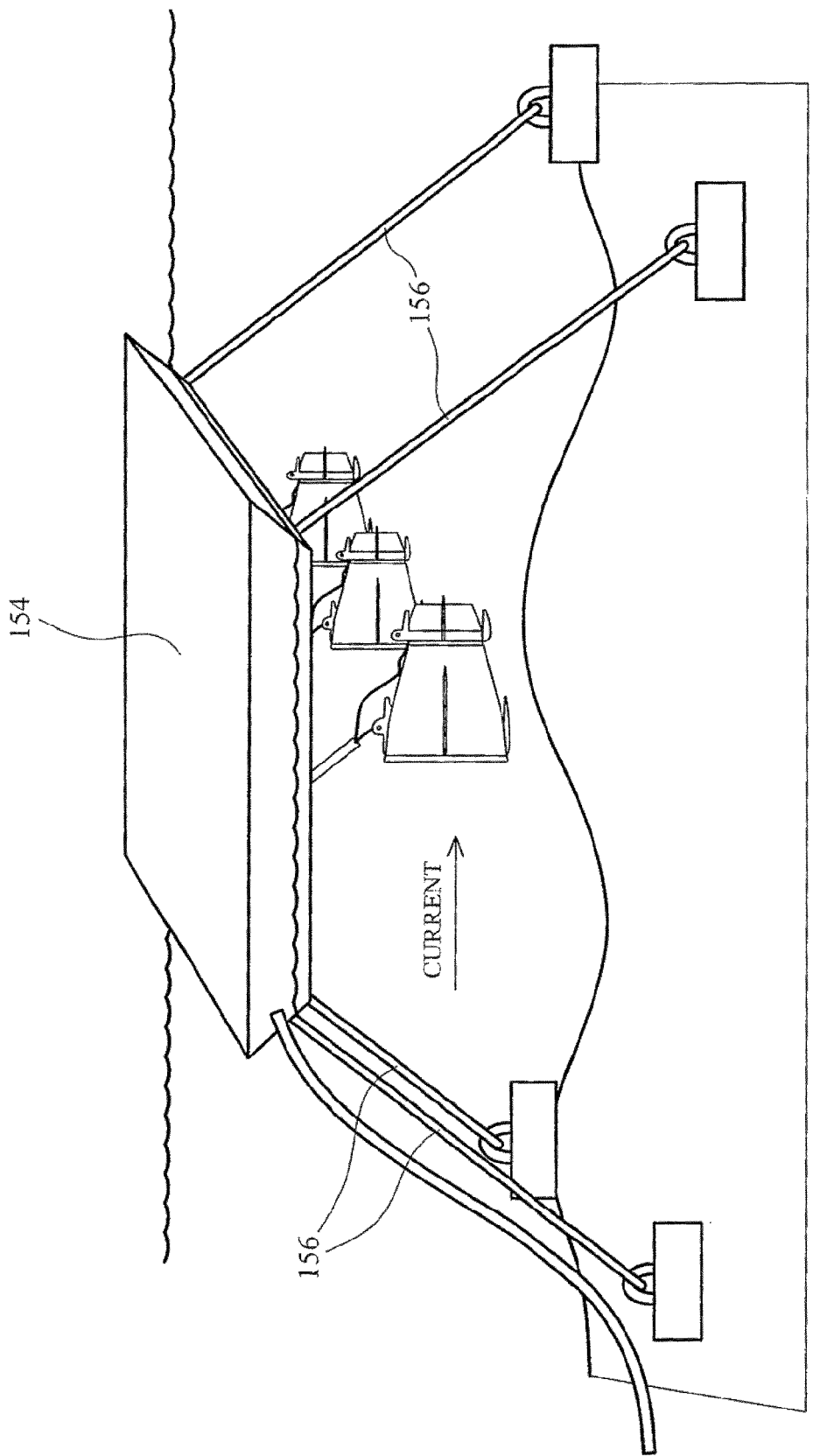
FIG. 16 shows a barged moored arrangement of a plurality of the generators shown in FIG. 1.
Figure 17:
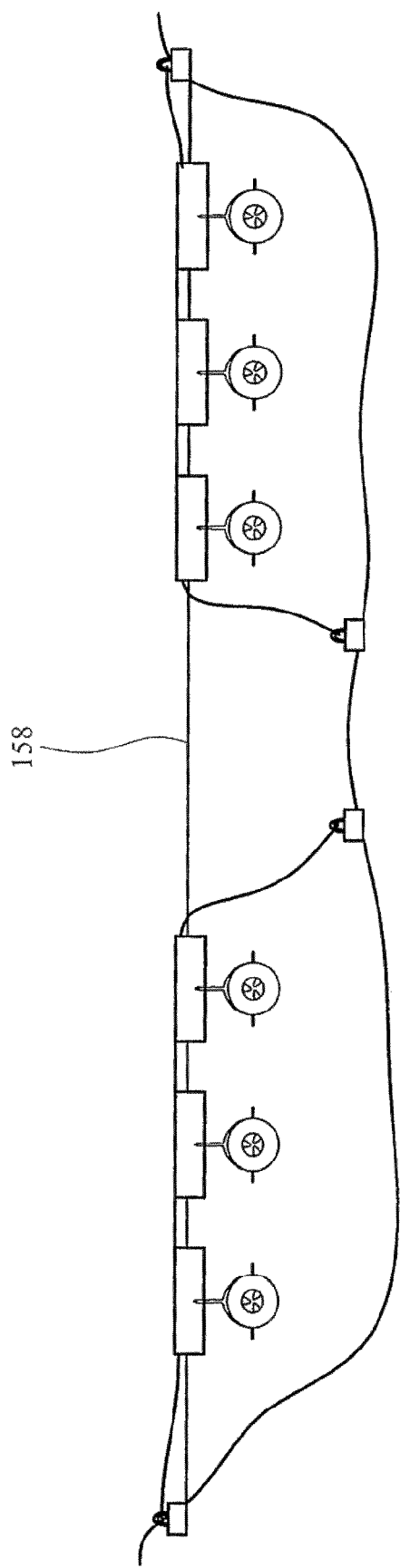
FIG. 17 shows a river crossing barge mounted arrangement of a plurality of the generators shown in FIG. 1.

Alternatively, as shown in FIG. 16, the turbines 4 can be mounted to a fixed barge to hang into a water stream. The turbines are connected to the underside of a barge 154 which is secured to fixed moorings by means of mooring ropes 156. Alternatively, as shown in FIG. 17, a series of barges can be interconnected across a river, leaving a central channel 158 for ship navigation.

Figure 18:
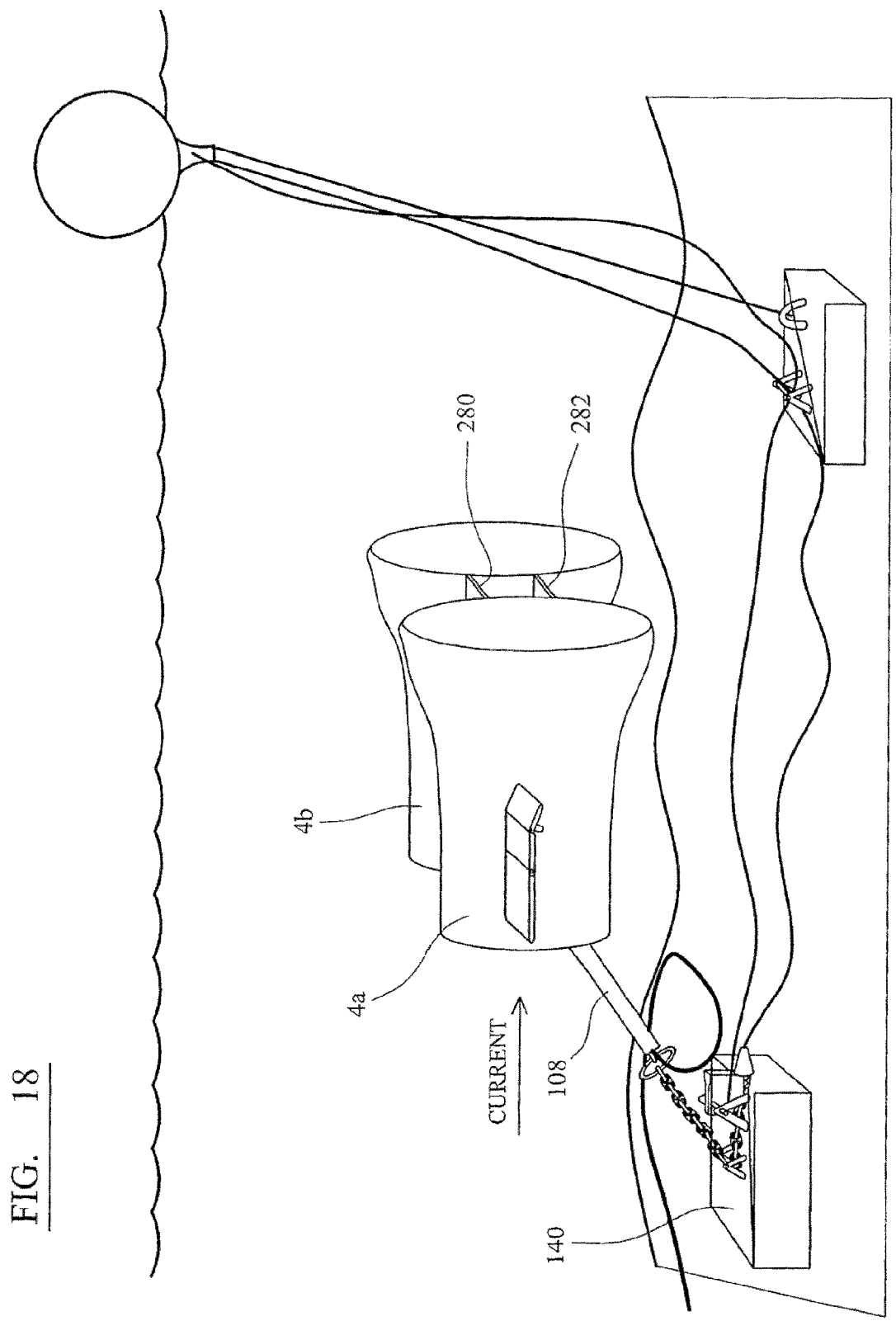
FIG. 18 shows a twin machine assembly of a further embodiment of the present invention.

A further embodiment of the invention is shown in FIG. 18, in which parts common to the embodiment of FIG. 14 are denoted by like reference numerals. In this embodiment two near identical turbines 4a, 4b are shown connected together by one or more struts 280, 282 extending transversely to the axes of rotation of the rotors of the turbines 4a, 4b along the external sides of the turbines 4a, 4b. The struts 280, 282 may be arranged to provide lift to the twin turbine arrangement. At a central point between the two turbines on the lower 282 of these struts (if more than one is present) an anchor chain 108 or cable is connected, which is connected at its other end to a fixed anchor point 140 on the sea bed.

The second turbine 4b differs from the first turbine 4a in that its blades are arranged to force the rim to which they are attached to rotate in the opposite direction to the blades and rim of the first turbine 4a.

As the twin turbines 4a, 4b are arranged to have counter rotating rotors within their respective turbines, any torque generated in an individual turbine stator, associated with resistance to motion of the magnets past the coils when load is drawn, is balanced by an equal and opposite reaction in its twin turbine. The twin turbine arrangement is thus balanced with no skewing motion about its anchor point.

The rear facing Venturi, acting as a diffuser rather than a concentrator, reduces and moves behind the turbine any eddy currents that may be generated by the flow of water going over the funnel outer diameter. This leaves the turbine to self orient in a cleaner flow regime than a forward facing concentrator Venturi would allow.

It will be appreciated by persons skilled in the art that the above embodiments have been described by way of example only, and not in any limitative sense, and that various alterations and modifications are possible without departure from the scope of the invention as defined by the appended claims. For example, instead of operating as an electricity generating apparatus for generating electrical power from flowing water, the present invention could also, or alternatively, operate as a motor for generating movement of water from electrical power.

The invention claimed is:

1. An electrical machine adapted to be constrained within a flow of fluid, the machine comprising:
    a stator adapted to be constrained within a flow of fluid;
    a rotor defining an aperture and having a plurality of rotor blades protruding from a peripheral region of the rotor into said aperture, wherein the rotor is adapted to be rotatably mounted to said stator such that movement of fluid through said aperture causes rotation of said rotor relative to said stator;
    at least one electricity generating apparatus adapted to generate electricity as a result of rotation of said rotor relative to said stator; and
    at least one adjusting apparatus for adjusting the orientation and/or depth of the machine in a manner dependent on the rate of flow of fluid, wherein at least one said adjusting apparatus comprises at least one first fin adapted to pivot relative to said stator such that the orientation of at least one said first fin relative to the stator depends upon the rate of fluid flow.

2. A machine according to claim 1, wherein the stator includes at least one first fluid flow rate increasing apparatus for increasing rate of flow of fluid through the rotor by directing fluid from a region of larger cross section to a region of smaller cross section.

3. A machine according to claim 1, further comprising at least one aligning apparatus for aligning the machine with the direction of flow of fluid.

4. A machine according to claim 3, wherein at least one said aligning apparatus comprises at least one second fin.

5. A machine according to claim 1, wherein part of at least one of said rotor and stator engages a groove in the other of said rotor and stator.

6. A machine according to claim 1, further comprising at least one friction reducing apparatus for reducing friction between the rotor and the stator.

7. A machine according to claim 6, wherein at least one said friction reducing apparatus includes at least one fluid directing apparatus for directing fluid between said rotor and said stator.

8. A machine according to claim 7, wherein at least one said fluid directing apparatus is adapted to scoop fluid from said flow of fluid and direct said fluid between said rotor and said stator.

9. A machine according to claim 7, wherein at least one said fluid directing apparatus includes at least one filter.

10. A machine according to claim 7, wherein at least one said fluid directing apparatus further comprises at least one particle removal apparatus for removing any particles lodged in at least one said fluid directing apparatus.

11. A machine according to claim 6, wherein at least one said friction reducing apparatus further comprises at least one second fluid flow rate increasing apparatus for increasing the rate of fluid flow between the rotor and stator.

12. A machine according to claim 6, wherein at least one said friction reducing apparatus further comprises at least one groove on a surface of at least one of said rotor and stator facing the other of said rotor and stator.

13. A machine according to claim 6, wherein at least one said friction reducing apparatus includes a plurality of mutually repelling first magnets on said rotor and stator.

14. A machine according to claim 1, wherein at least one said electricity generating apparatus comprises at least one second magnet provided on said rotor and at least one coil on said stator in which electrical current is induced as a result of rotation of the rotor relative to the stator.

15. A machine according to claim 1, wherein the rotor and/or machine is adapted to be substantially neutrally buoyant within the flow of fluid when the fluid is water.

16. A machine according to claim 1, further comprising at least one debris directing apparatus for directing debris in said flowing fluid away from the junction between said rotor and stator.

17. A machine according to claim 16, wherein at least one said debris directing apparatus comprises at least one third fin.

18. A machine according to claim 1, further comprising at least one mooring apparatus for constraining the machine within a body of flowing fluid.

19. A machine according to claim 18, wherein at least one said mooring apparatus includes at least one cable and at least one releasable catch for releasably mounting the machine to the floor of a body of flowing fluid.

20. A machine according to claim 1, wherein at least one said blade has a respective sacrificial zone.

21. A machine according to claim 1, further comprising a plurality of mutually repelling third magnets arranged on the rotor and the stator for supporting the weight of the rotor.

22. A machine according to claim 1, wherein at least one said electricity generating apparatus further comprises at least one solid state component encased within a plastic based matrix.

23. A machine according to claim 1, wherein the machine is adapted to receive input electricity to cause movement of ambient fluid.

24. A machine according to claim 1, further comprising a respective gap between distal ends of at least one pair of adjacent said blades.

25. A machine according to claim 24, wherein at least one pair of adjacent said blades are connected to each other in the vicinity of proximal ends thereof only.

26. A machine according to claim 1, including at least one apparatus for self centralisation of the rotor within the stator.

27. A machine according to claim 1, including a compliantly moored anchor system.

28. A machine according to claim 27, wherein the compliantly moored anchor system is adapted to operate by means of a quick release allowing the machine to surface while still retaining a connection to an anchor.

29. A machine according to claim 28, including a 'plug and play' quick release system to allow rapid removal of the machine from the anchor system.

30. A twin machine assembly including a pair of machines according to claim 1, wherein the machines have counter rotating rotors connected together.

* * * * *